United States Patent
Milliere

(10) Patent No.: US 6,530,544 B2
(45) Date of Patent: Mar. 11, 2003

(54) DEVICE AND MECHANISM FOR TRANSMISSION OF RADIAL FORCES BETWEEN THE CENTRAL AND END REGIONS OF THIS DEVICE

(75) Inventor: Jérôme Milliere, Legvevin (FR)

(73) Assignee: Airbus France, Toulouse (FR)

(*) Notice: Subject to any disclaimer, the term of this patent is extended or adjusted under 35 U.S.C. 154(b) by 0 days.

(21) Appl. No.: 09/978,555

(22) Filed: Oct. 18, 2001

(65) Prior Publication Data
US 2002/0125369 A1 Sep. 12, 2002

(30) Foreign Application Priority Data
Oct. 26, 2000 (FR) .............................. 00 13736

(51) Int. Cl.⁷ ................................. B64C 3/38
(52) U.S. Cl. ..................... 244/213; 244/75 R; 244/214; 244/216; 403/150
(58) Field of Search .............. 244/75 R, 131, 244/213–216, 123; 74/96; 403/150

(56) References Cited

U.S. PATENT DOCUMENTS

| 2,246,116 | A | * | 6/1941 | Wagner et al. | ............... 244/216 |
| 2,779,555 | A | * | 1/1957 | Danielson | ................... 244/216 |
| 3,756,089 | A | * | 9/1973 | Haladay | ........................ 74/96 |
| 3,844,663 | A |   | 10/1974 | Prette |  |
| 4,405,405 | A | * | 9/1983 | Dilmaghani et al. | ........ 244/213 |
| 4,497,461 | A | * | 2/1985 | Campbell | ................. 244/75 R |
| 6,270,039 | B1 | * | 10/1999 | Linjama | ..................... 244/213 |

* cited by examiner

Primary Examiner—Galen L. Barefoot
(74) Attorney, Agent, or Firm—Thelen Reid & Priest LLP

(57) ABSTRACT

A device (22) fitted with ribs is placed on a cylindrical rod (20) so that it is fixed to it in bending. The device (22) is formed of at least three ribs connected to each other at their ends, and at least one pair of elements in the form of a star connecting the ribs together, at least close to its central region. This device enables the rod (20) to apply an approximately radial force to the center of the rod through an actuator onto webs (24) bearing on its ends, minimizing the mass for a given spacing of the webs (24). The device is particularly applicable to the control of aircraft control surfaces.

10 Claims, 4 Drawing Sheets

DEVICE AND MECHANISM FOR TRANSMISSION OF RADIAL FORCES BETWEEN THE CENTRAL AND END REGIONS OF THIS DEVICE

TECHNICAL FIELD

The invention relates to a device centered on a predetermined longitudinal axis designed to transmit forces between a central region and end regions of the said device.

The invention is also applicable to a mechanism comprising such a device associated with a cylindrical rod acting as a pivot pin, and forces are transferred between the pivot pin and two parts, one of the parts applies forces to the pivot pin and the pivot pin applies forces to the other part.

The invention also relates to application of a mechanism of this type to the transmission of forces between a linear actuator mounted on a fixed aircraft structure and a control surface that can pivot about the fixed structure, around an axis of rotation parallel to the longitudinal axis of the force transmission part and offset from this axis. In particular, the fixed structure may be an element of a wing, vertical stabilizer, tail fins or the fuselage of the aircraft.

STATE OF THE ART

An aircraft control surface is normally articulated on the structural elements of the aircraft, considered as being the fixed part for the mobile control surface so that it can pivot about an axis of rotation related to this fixed part. The rotation movement of the control surface is controlled by a servocontrol materialized by a linear actuator supported on the fixed part of the aircraft. The linear actuator is fitted with a ball end. This acts on the control surface through fittings fixed to the control surface through screws, rivets, etc. The fittings also control rotation of the control surface with respect to the fixed part of the aircraft.

A fitting illustrating the state of the art is diagrammatically shown in perspective view in FIG. 1 on the attached drawings.

In its central region, the fitting generally comprises a double eye plate 1 retaining a first pivot pin (not shown) on which the linear actuator ball end is mounted. In its two end regions, the fitting also comprises a single eye plate 2 through which a second pivot pin (not shown) passes supported by the fixed part. This second pivot pin materializes the X—X axis of rotation of the control surface. The Y—Y longitudinal axis of the first pivot pin and the X—X axis of rotation of the control surface are parallel and offset from each other by a distance d. Bearings and rings (not shown) are provided between the double and single eye plates 1 and 2 of the fitting and the pivot pins.

In this known layout, the central point A of the double eye plate 1 of the fitting is at a distance D from the point B half way between each of the single eye plates 2 of the fitting, in a direction parallel to X—X and Y—Y axes of the pivot pins. The distance d between these axes represents the lever arm of the force transmission mechanism materialized by the fitting. The force exerted by the linear actuator associated with the lever arm generates a rotation moment of the control surface around its X—X axis of rotation. Thus this controls rotation of the control surface about this axis.

When the control surface is actuated, a large proportion of the forces exerted by the linear actuator pass through the double eye plate 1 located in the central part of the fitting to the single eye plates 2 located at the end part of the fitting through the structures of the fitting or the control surface. The stresses and deformed shapes generated by application of these forces on the structure of the fitting are proportional to the distance D between the double eye plate 1 and each of the single eye plates 2 in the fitting, in a direction parallel to the X—X and Y—Y axes of the pivot pins.

In practice, the distance between the single eye plates 2 placed at the ends of the fitting and consequently the distance D, depend on the size of the actuator and the clearances necessary for maintenance operations. Furthermore, the size of the actuator depends on its type (EHA—"Electro-Hydraulic Actuator"—, EBHA—"Electro-Backup Hydraulic Actuator", etc.), its characteristics (stop load, distance traveled, etc.) and the technology used (hydraulic unit made of aluminum, titanium, etc.).

Therefore when the size of the servocontrol increases, the distance D between the double eye plate 1 connected to the central part of the fitting and the single eye plates 2 located at the ends of the fitting has to be increased. This results in a large increase in the mass of the fitting to limit stresses and deformations within it. However, this type of increase in mass is usually incompatible with the required performances for the aircraft.

PRESENTATION OF THE INVENTION

The purpose of the invention is a device designed to transmit approximately radial forces between a central region and end regions of the said device, the innovative design of which makes it capable of resisting very high bending forces with a significantly lower mass than a cylindrical pivot pin with a conventional design.

This result is achieved according to the invention using a device for transmission of forces in a direction approximately radial from a longitudinal axis of the said device, between a central region and two end regions of the device, the said device being characterized in that it comprises at least three ribs distributed around the said longitudinal axis and connected to each other in the said end regions, and at least one pair of elements in the shape of a star connecting the ribs together on each side of the said central region.

The ribbed structure of the force transmission device is capable of absorbing most bending forces due to the high moment of inertia that it creates for a given section. This design thus optimizes the mass of the structure.

It is particularly advantageous if the force transmission device according to the invention is made in a single part.

In one preferred embodiment of the invention, the ribs are uniformly distributed around the longitudinal axis of the said device.

In the same embodiment, the force transmission device is symmetric about a median plane perpendicular to the longitudinal axis of the said device.

All ribs can be made identical to simplify manufacture.

Advantageously, the ribs are connected to each other in the said end regions by two first rings and each of the star shaped elements comprises a second ring at its center, the first and second rings being along the said longitudinal axis.

Another purpose of the invention is a force transmission mechanism comprising a force transmission device as described above and a cylindrical rod acting as a pivot pin passing through the first and second rings so that it is fixed in bending to the force transmission device, the cylindrical rod acting as a bearing for a first part between a pair of star shaped elements adjacent to the central region and a second part beyond the first rings.

Advantageously, the elements forming bearings are then inserted between the cylindrical rod and each of the first and second rings.

Beyond the first rings, the cylindrical rod advantageously passes through two approximately plane webs, that can be fixed to the second part. The two webs thus form a double eye plate articulated onto a single eye plate connected to the first part, through the cylindrical rod, and two single eye plates articulated on two double eye plates linked to a fixed external structure through a second cylindrical rod acting as a pivot pin centered on an axis of rotation of the second part with respect to the fixed structure, this axis of rotation being parallel to the longitudinal axis of the force transmission device.

In one preferred application of the invention, the first part is a rod of an actuator with linear control supported by the fixed structure and the second part is an aircraft control surface.

BRIEF DESCRIPTION OF THE DRAWINGS

We will now describe a preferred embodiment of the invention as a non-limitative example, with reference to the attached drawings in which.

DETAILED DESCRIPTION OF A PREFERRED EMBODIMENT

Figure 1:
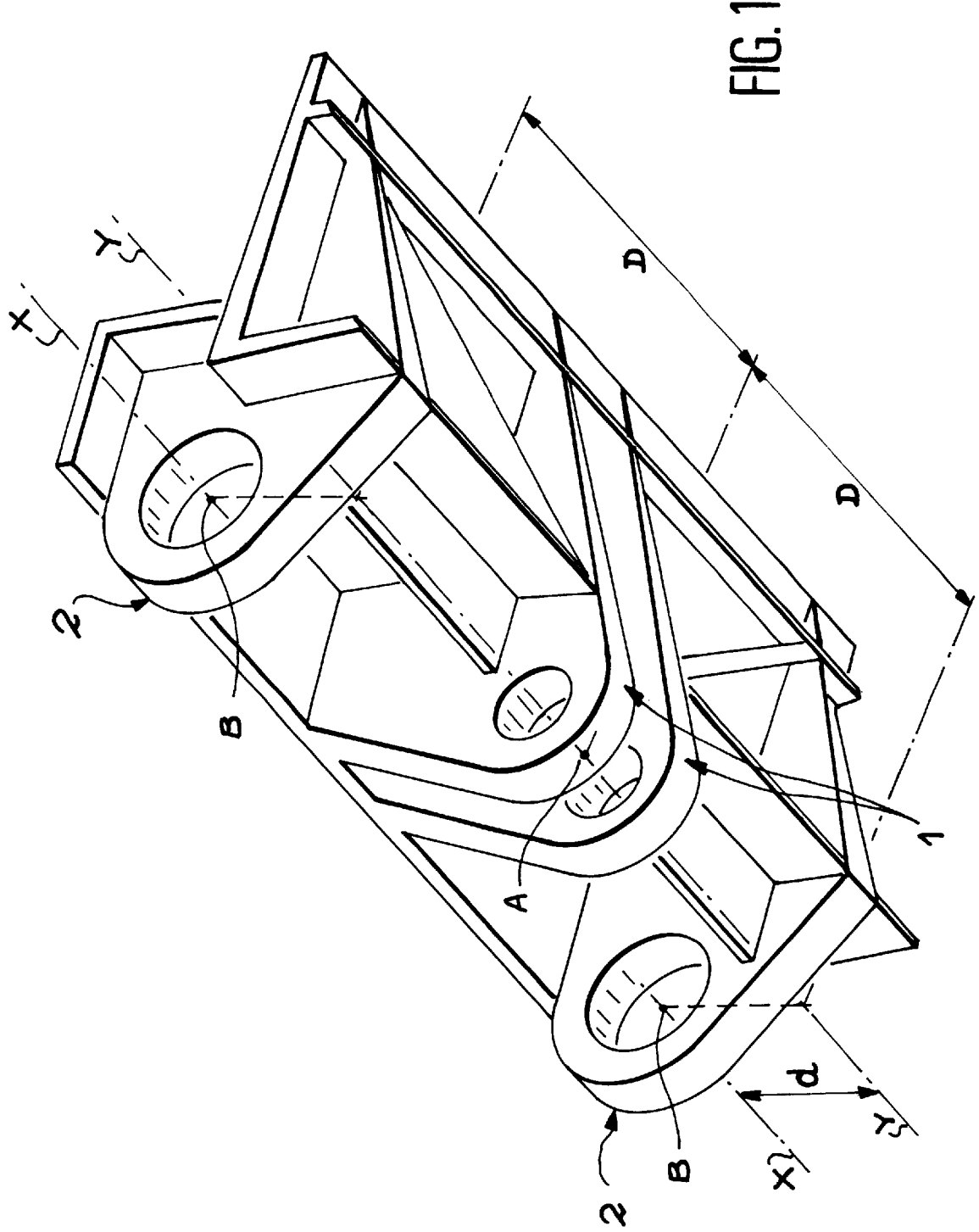
FIG. 1, already described, shows a perspective view of an assembly fitting for an aircraft control surface according to prior art.
Figure 2:
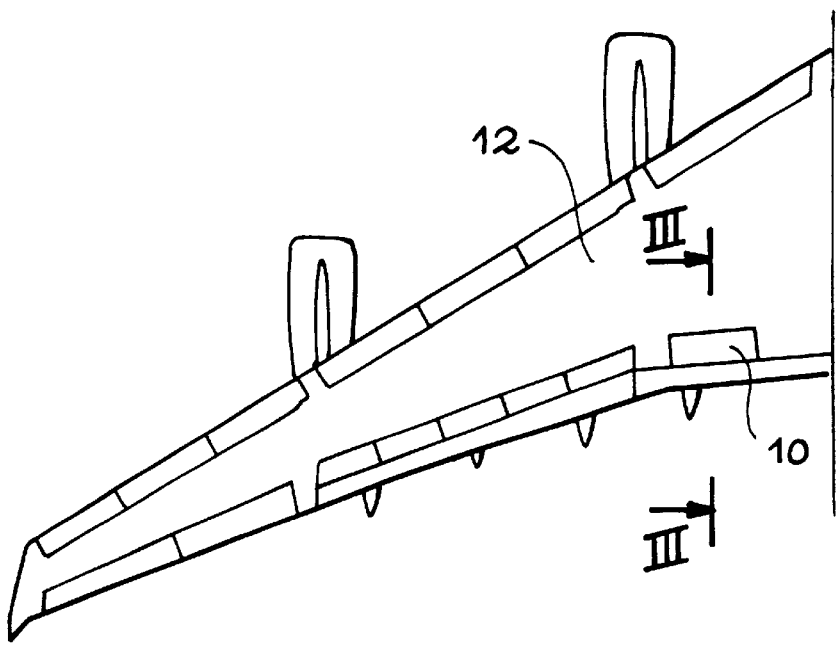
FIG. 2 diagrammatically shows a top view of an aircraft wing on which control surfaces are articulated that can be actuated by means of force transmission devices according to the invention.
Figure 3:
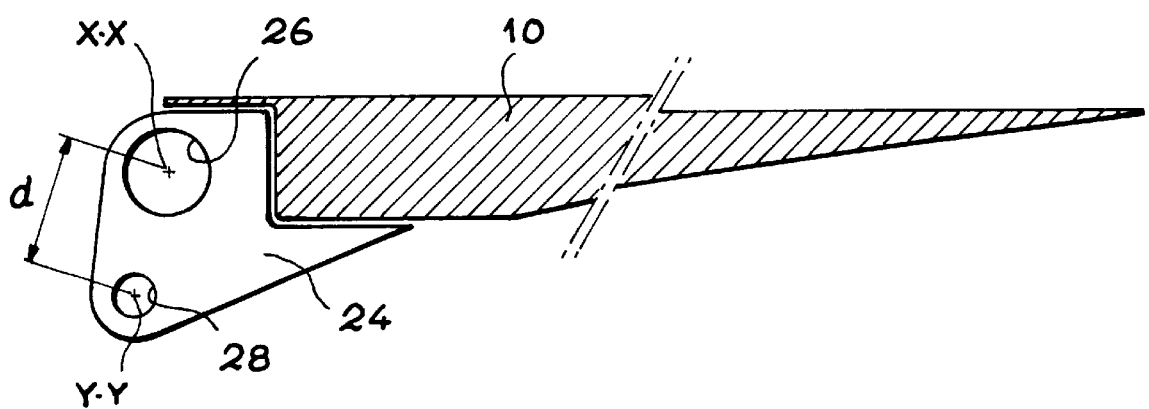
FIG. 3 is a sectional view at a larger scale along line III—III in FIG. 2.

As shown in FIG. 2 in the particular case of an aircraft wing, an aircraft normally comprises a large number of control surfaces. In this case, as in the rest of the text, this refers to all types of flaps, ailerons, etc., that are articulated to a fixed part of the aircraft such as the wing, vertical stabilizer, tail fins or the fuselage, so that the pilot can modify some flight characteristics such as the heading, speed, lift, etc.

Each control surface such as that shown by reference 10 in FIG. 2 can be articulated to the corresponding fixed part through a force transmission device according to the invention. In the embodiment shown as an example in FIGS. 2 to 5, the fixed part is composed of the wing 12 of the aircraft and the force transmission mechanism in general is denoted as reference 14.

The force transmission mechanism 14 is a structure that pivots the control surface 10 on wing 12 and transmits forces that may be applied by an aircraft servocontrol (not shown) to the control surface 10.

The servocontrol usually comprises an individual linear actuator assigned to the control of each control surface. This linear actuator is housed in the fixed part supporting the control surface, in other words in the wing 12 in the embodiment shown. Only the end of the control rod of this actuator is illustrated in 16 in FIG. 4. This end acts on the force transmission device 14 through a ball end 18.

Figure 4:
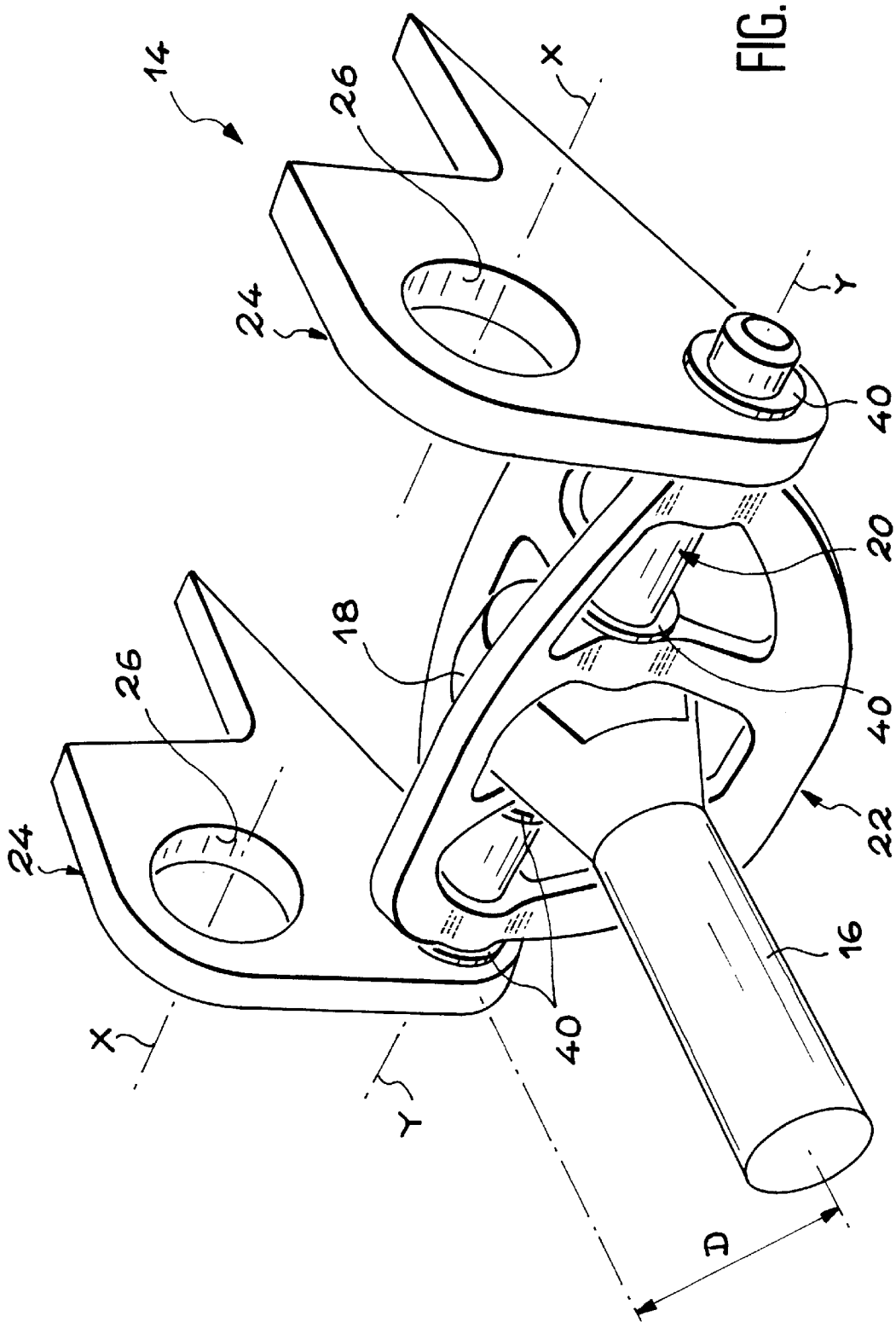
FIG. 4 is a perspective view of a force transmission device according to the invention.

More precisely, if X—X denotes the axis of rotation of the control surface 10 with respect to the wing 12, the control rod 16 of the linear actuator acts on the force transmission device 14 through a geometric axis Y—Y parallel to the X—X axis, but offset from this axis by a distance d (FIG. 4).

In the embodiment shown in FIGS. 2 to 5, the force transmission device 14 comprises mainly a cylindrical rod 20 acting as a pivot pin, a force transmission device 22 and two approximately flat webs or plates 24.

The two webs 24 are usually identical and parallel to each other, in planes approximately perpendicular to the X—X and Y—Y axes. As illustrated very diagrammatically in FIG. 3, they are designed to be fixed to the control surface 10 perpendicular to its plane. They may be attached by any appropriate means, and particularly by screwing, riveting, welding, etc.

Each of the webs comprises a first circular hole 26 centered on the X—X axis, and a second circular hole 28 centered on the Y—Y axis.

The first holes 26 are used for the pivoting assembly of the control surface 10 onto wing 12, through a cylindrical rod (not shown) acting as a pivot pin. More precisely, each of the webs 24 forms a single eye plate that is articulated through the above-mentioned cylindrical rod to a double eye plate (not shown) linked to the wing.

The end regions of the cylindrical rod 20 acting as a pivot pin fit into the second holes 28 and are free to rotate in them, as illustrated in FIG. 4. Therefore, the webs 24 also form a double eye plate that is articulated on the single eye plate formed by the ball end 18, through the cylindrical rod 20.

Note that the separation between the webs 24 increases with the size of the actuator. However, the use of the force transmission device 22 according to the invention can considerably limit the increase in mass due to the increased distance between the webs, as will be understood later.

The cylindrical rod 20 is placed coaxially inside the force transmission device 22, such that these two parts are connected to each other, at least in bending. The longitudinal axis common to the cylindrical rod 20 and the device 22 is the geometric Y—Y axis along which the control rod 16 of the linear actuator acts on the force transmission device 24.

In this layout specific to the invention, the assembly composed of the cylindrical rod 20 and the force transmission device 22 forms a double pivot pin centered on the Y—Y axis. The purpose of this double pivot pin is to transmit forces applied approximately radially by the actuator control rod 16 at the central part of the cylindrical rod 20 (FIG. 4), to the webs 24. More precisely, the double pivot pin formed by the cylindrical rod 20 associated with the force transmission device 22 is designed to transmit the forces applied by the control rod 16 of the actuator to the webs 24 with an optimized (in other words minimum) mass, regardless of the value of the distance D (FIG. 4) separating the axis of the control rod 16 from the median plane of each of the webs 24.

This result is achieved by using a force transmission device 22, the structure of which will now be described in detail with reference to FIG. 5.

Figure 5:
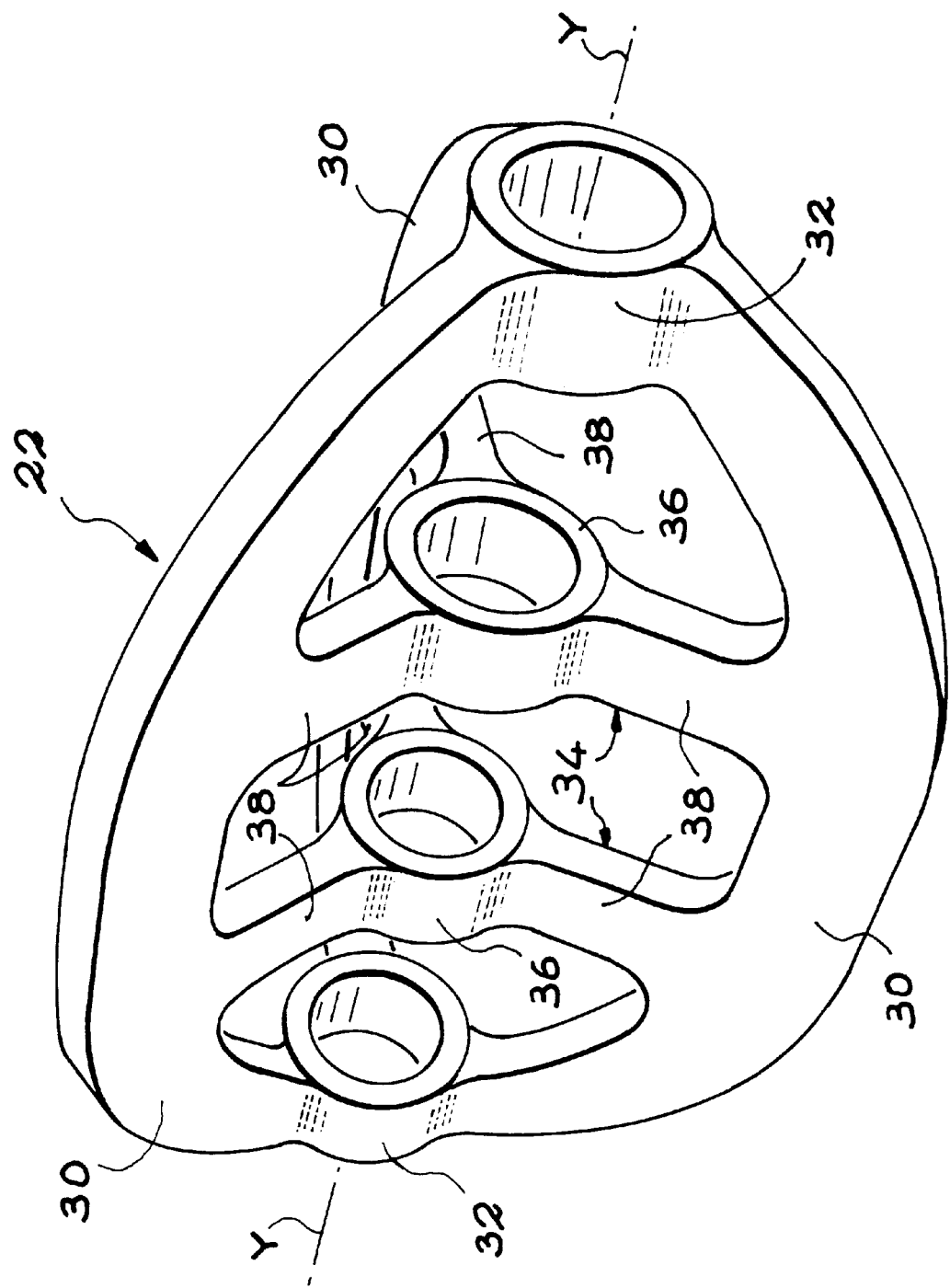
FIG. 5 is a perspective view of a force transmission device forming part of the mechanism in FIG. 4.

In the embodiment shown in FIG. 5, the force transmission device 22 is made of a single part. It comprises three ribs 30 identical to each other and uniformly distributed around the Y—Y axis. Each of the ribs 30 is approximately plane and its median plane passes through the Y—Y axis. Furthermore, the ribs 30 are approximately in the shape of a C and are connected to each other in the end regions of the device 22. More precisely, the ends of the ribs 30 are connected to each other by two first rings 32 centered on the Y—Y axis.

The force transmission device 22 illustrated in FIG. 5 also comprises a pair of elements 34 in the shape of a star. These elements 34 connect the ribs 30 together on each side of the central region of the device 22. More precisely, in the embodiment illustrated as an example in FIG. 5, each of the star shaped elements 34 comprises a second ring 36 at its center, and three branches 38 connecting the second ring 36 to each rib 30. The second rings 36 are usually identical to the first rings 32 and their centers are on the same Y—Y axis. The branches 38 are radial from the Y—Y axis and the thicknesses are generally the same as the thicknesses of ribs 30. However, the thicknesses of branches 38 may also be different from the thicknesses of ribs 30.

The spacing between the star shaped elements 34 parallel to the Y—Y axis, is adjusted such that the distance between the second rings 36 is equal to at least the width of the ball end 18 of the control rod 16 (FIG. 4) that fits between these elements 34.

In alternative embodiments (not shown), the three ribs 30 distributed at 120 degrees from each other may be replaced by a larger number of ribs, and particularly by four ribs distributed at 90 degrees from each other. The number of branches 38 of the star shaped elements 34 is then modified in the same manner.

Other alternative embodiments (not shown) include one or several pairs of star shaped elements added between the first rings 32 and the pair of star shaped elements 34 adjacent to the central region of the force transmission device 22. In particular, this modification may be justified by an increase in the length of device 22. Regardless of the number of pairs of star shaped elements used in the composition of the device 22, it remains symmetric about a median plane perpendicular to the Y—Y axis.

As an example of the invention that does not restrict the scope of the invention in any way, the height of the ribs of a force transmission device 22 with three ribs as illustrated in FIG. 5 and with a length of 360 mm, may be 130 mm.

As shown in FIG. 4, the force transmission device 22 is installed on the cylindrical rod 20 through elements 40 forming bearings, such as bearing rings or others. However, these elements may be deleted without going outside the framework of the invention.

In the assembly illustrated in FIG. 4, when the linear actuator is applied, a force is exerted on the central region of the cylindrical rod 20 perpendicular to its longitudinal Y—Y axis to control pivoting of the control surface 10 about its axis of rotation X—X, in either direction.

Due to the presence of the force transmission device 22 about the cylindrical rod 20, this force is entirely transmitted to the webs 24 connected to the control surface by means of a mechanism with a minimum mass regardless of the distance D separating it from the central and end regions of the rod 20. The ribbed structure of the force transmission device 22 generates a high moment of inertia that enables it to absorb most bending forces. Furthermore, this moment of inertia is constant about its Y—Y axis for a given section, regardless of its angular position.

The presence of the force transmission device 22 with optimized design, around the cylindrical rod 20, means that the diameter of the cylindrical rod can be about the same as the diameter that would be used with a conventional articulation fitting comprising a double eye plate directly enclosing the ball end 18. Consequently, the global mass of the device is optimized, regardless of the size of the linear actuator that controls the flap.

Although the entire description given above applies to the control of aircraft control surfaces, it is important to note that the invention is in no way limited to this application. The force transmission device and mechanism described above and the different alternatives mentioned may be used in all cases in which an approximately radial force has to be transmitted between the central region and end regions of the mechanism. This situation occurs in many different mechanisms and in a wide variety of technical fields such as the aeronautical and space industries, the automobile industry, machine tools, farm machinery, etc.

Note also that the device 22 and the rod 20 may be made of a single piece without going outside the scope of the invention.

What is claimed is:

1. Device for transmission of forces in approximately the radial direction from a longitudinal axis of the said device, between a central region and two end regions of the device, the said device being characterized in that it comprises at least three ribs distributed around the said longitudinal axis and connected to each other in the said end regions, and at least one pair of elements in the shape of a star connecting the ribs on each side of the said central region.

2. Force transmission device according to claim 1, in which the said device is made in a single part.

3. Force transmission device according to claim 1, in which the ribs are uniformly distributed around the said longitudinal axis.

4. Force transmission device according to claim 1, in which the said device is symmetric about a median plane perpendicular to the said longitudinal axis.

5. Force transmission device according to claim 1, in which all ribs are identical.

6. Force transmission device according to claim 1, in which the ribs are connected to each other in the said end regions by two first rings and each of the star shaped elements comprises a second ring at its center, the first and second rings along the said longitudinal axis.

7. Force transmission mechanism comprising a force transmission device according to claim 6 and a cylindrical rod acting as a pivot pin passing through the first and second rings so that it is fixed in bending to the force transmission device, the cylindrical rod acting in bearing for a first part between a pair of star shaped elements adjacent to the central region and a second part beyond the first rings.

8. Force transmission mechanism according to claim 7, in which the elements forming bearings are inserted between the cylindrical rod and each of the first and second rings.

9. Force transmission mechanism according to claim 7, in which the cylindrical rod passes through two approximately plane webs, that can be fixed to the second part, beyond the first rings, the two webs being designed to be fixed to the second part, the said webs forming a double eye plate articulated onto a single eye plate connected to the first part through the cylindrical rod, and forming two single eye plates articulated on two double eye plates linked to a fixed external structure through a second cylindrical rod acting as a pivot pin centered on an axis of rotation of the second part with respect to the fixed structure, this axis of rotation being parallel to the said longitudinal axis.

10. Mechanism according to claim 7, in which the first part is a rod of an actuator with linear control supported by the fixed structure and the second part is an aircraft control surface.

* * * * *